June 18, 1940.  H. E. LEE ET AL  2,204,898
PROCESS FOR THE PRECIPITATION OF MATERIALS FROM SOLUTION
Filed April 23, 1938
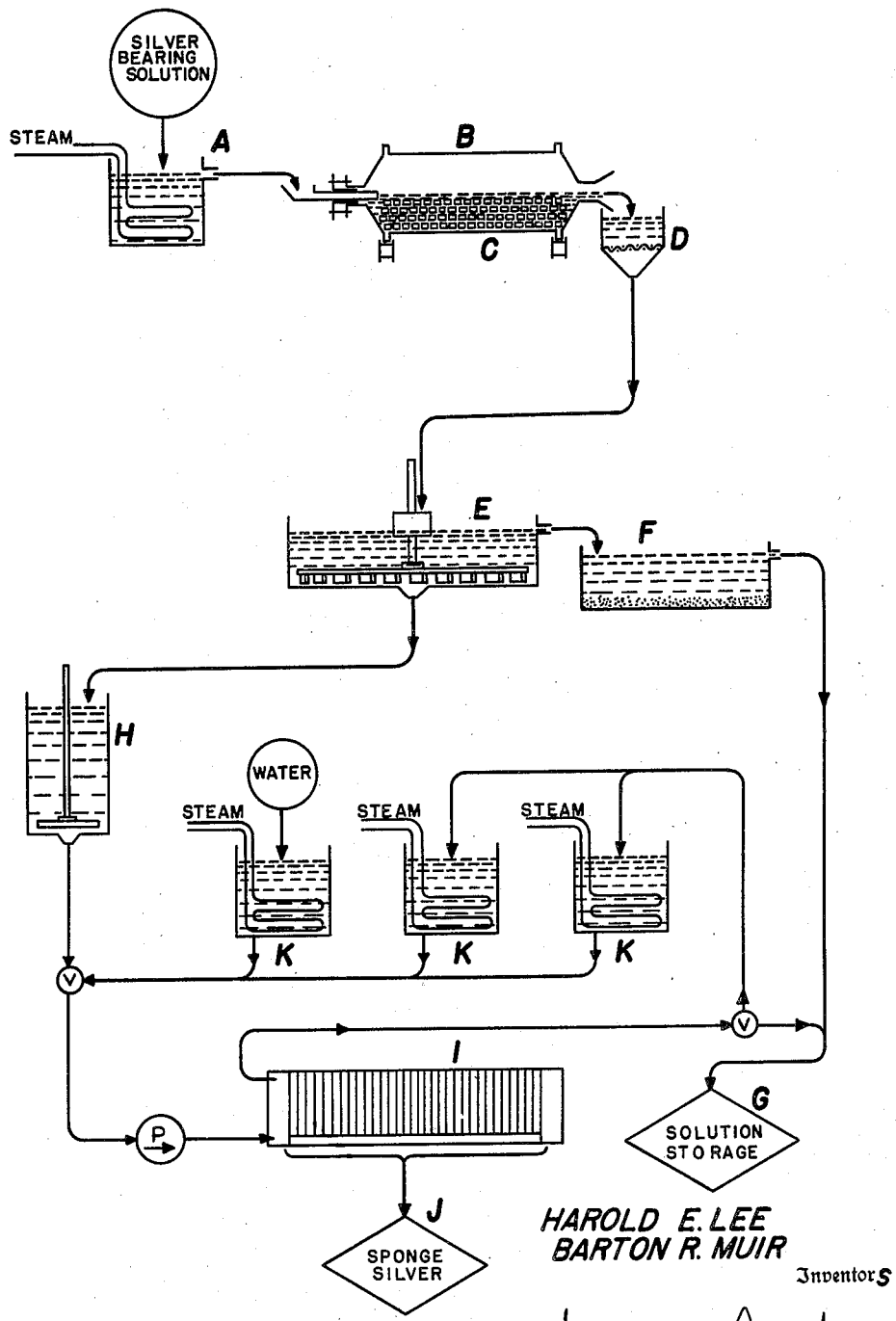
HAROLD E. LEE
BARTON R. MUIR
Inventors Patented June 18, 1940

2,204,898

UNITED STATES PATENT OFFICE 2,204,898

PROCESS FOR THE PRECIPITATION OF MATERIALS FROM SOLUTION

Harold Eugene Lee and Barton Robert Muir, Kellogg, Idaho, assignors to Bunker Hill & Sullivan Mining & Concentrating Company, Kellogg, Idaho, a corporation Application April 23, 1938, Serial No. 203,969

2 Claims. (Cl. 75—109)

Our present invention relates to an improved process for the precipitation of materials from solution and more particularly to the precipitation of constituents from acid, neutral, or basic solutions resulting from the leaching of ores, concentrates, or other materials, by contact with solid precipitants.

In the prior art it is well known that the precipitation of components from solution may be attained by exposure of the solution to materials more soluble than the component or components to be precipitated, more particularly, by the replacement of a metal or metals from solution by exposure of the solution to material of preceding order in the electromotive series, a specific example being the precipitation of silver from its solutions by exposure to materials more electropositive, such as copper or iron. As is evident, the rate of precipitation attained, is proportionate to the exposed surface area of the precipitant, and is also considerably influenced by temperature variations; increased temperatures increasing the activity of the components involved.

In common applications of the foregoing principles, attempts to effect the exposure of large surface areas to contact with the solutions being treated, by employing precipitants in finely divided form, such as sponge, powder, dust, or pellets, have resulted in undue consumption of precipitant and contamination of the precipitate because of the difficult separation of the finely divided excess precipitant, needed to complete the reaction, from the finely divided precipitate. In cases where the separation of the excess precipitant from the precipitate is rendered less difficult by the use of precipitants in a sufficiently massive form, relatively bulky units are necessary along with the employment of higher temperatures and longer contact periods; also, in many cases the reaction rate is retarded, even when the solution is kept in movement by efficient agitation, through a decrease in the active exposed surface area by a gradual coating of the precipitant with a more or less protective layer of precipitate or other materials of the system. By aid of the improvements outlined by this invention, the precipitation of components from solution by contact with solid precipitants may be accomplished in comparably small units with low heat consumption and short contact periods, at the same time allowing a ready separation of the precipitate from the precipitant.

In accordance with this invention, the precipitation of a component, or components, from solution is effected by contact with a charge of precipitant, of such state of division as to allow a ready separation from the finely divided material precipitated, to which has been imparted sufficient motion for agitation of the mixture and for surface cleansing of the individual units by abrasion of one against another, the precipitation being effected in batches during a single contact period or by circulation through a number of shorter periods, or by continuous flow through a single precipitator or a number of precipitators in series, and the finely divided precipitate, maintained in suspension by the turbulence of the mixture, being separated from the excess precipitant by displacement with the solution leaving the precipitator and conveyed to suitable apparatus for effecting the separation of liquid from solids; the barren solution being wasted, or used as return solvent or conveyed to subsequent operations for recovery of values and regeneration, or combinations of such utility.

The accompanying drawing, representing a diagrammatic view of a suitable apparatus by which the foregoing principles may be carried out, has been included as part of the application to better illustrate the nature of the process. This in conjunction with its application to one specific type of solution will clearly depict its utility and demonstrate the improved results obtained.

Referring to the above mentioned drawing, the solution to be treated may be continuously conducted from its source through a header box A, where the solution temperature may be closely regulated, and thence into a cylinder B rotating about its horizontal axis which imparts its motion to a charge of precipitant C consisting of numerous pieces such as blocks, rods, or balls of sufficient size as to allow a ready separation from the finely divided precipitate; the motivated precipitant thoroughly agitating the solution thus providing huge contact areas to precipitant surfaces that are continuously cleaned of protective coatings or freed of protective layers of practically barren solution by their motion and abrasive action due to their rolling or sliding past one another or the cylinder wall. The finely divided precipitate, maintained in suspension by the turbulence of the mixture, may then be removed from the excess precipitant by overflowing the solution and suspended precipitate, by means of a trunnion discharge from a level substantially above the path of the precipitant charge, through an outside screen D, utilized as an added precaution against contamination, and thence to a decanting thickener or thickeners E, from which the thickened precipitate may be pumped through an agitator H, to a filter I. The filtered precipitate may then be washed by an advancing series of washers K, and the washed cake discharged into a receiver J. The barren thickener overflow may be passed through a settler F, and thence, joining the most advanced flow of wash solution, to solution storage G.

In a particular case, applicable to the general preferred method of treatment, illustrated by the accompanying drawing, neutral silver bearing copper sulphate solution was continuously conveyed from the leaching operations to a header box where the temperature was so regulated, by means of steam coils, as to maintain the precipitator discharge at a temperature closely approximating 55° C., and thence through a feed pipe, sealed against leakage by means of a packing gland, into a cylinder, rotating about its horizontal axis, containing a charge of rectangular copper blocks of an average size approximating two inches square and one inch thick; the rotation of the cylinder being so regulated as to impart just sufficient turbulence to the charge to provide adequate agitation of the solution and suitable movement of the individual copper blocks for surface cleaning by abrasion. The finely divided silver precipitate, maintained in suspension by the motion of the charge, was continuously overflowed by displacement from a trunnion discharge maintained at a level substantially above the path of the copper blocks, through a screen to a decanting thickener.

The silver barren thickener overflow was continuously conducted through a settler, utilized as a precaution against the occurrence of silver suspensions in the solution leaving the system, to storage partially for use as return solvent and partially for treatment for recovery of the copper contained; the thickened silver sludge was pumped through an agitator to intermittent filtration where it was separated from the bulk of associated solution, then washed with an advancing series of washes, the filtrate, and eventually the wash solution, joining the silver free settler overflow and the washed, dewatered silver cake discharged from the filter.

The operating temperature, speed, and dimensional requirements of the precipitating unit are variables, depending upon the quantity of solution to be treated, the concentrations of the constituent or constituents to be precipitated and other local considerations. Under preferable conditions, the volume of the precipitator is such as to allow an ample contact time between the solution and the precipitant for complete precipitation of the desired constituents during its passage through the unit, preventing a short circuiting of the flow by either the use of baffles, or providing sufficient length of the path of flow to insure the dispersion into the agitating mixture, of all currents which tend to short circuit solution through the system.

The temperature of the precipitating system should be maintained as high as is economical, and the operating speed high enough to allow a thorough agitation of the mixture, and of such nature as to impart sufficient movement to the individual components of the precipitant bed to insure the continuous exposure of the maximum area of active precipitant surface, by the abrasion and removal of surface coatings of precipitate, insoluble salts, solution films low in concentration of the constituent desired precipitated, or combinations of such surface conditions tending to retard the rate of precipitation, without causing excessive abrasion of the precipitant and the surfaces activating the movement.

In the specific example under consideration, the rotation of a drum, 30 inches in diameter, at the rate of 2 R. P. M., was found to provide suitable operating conditions. Maintaining a temperature approximating 55° C., neutral copper sulphate solution bearing about 3.5 grams of silver per liter as silver sulphate was continuously entered into the rotating system and discharged free of all dissolved silver, the rate of precipitation of silver per cubic foot of precipitator chamber averaging somewhat over 225 ounces per 24 hours.

The above precipitating capacity was found to be much in excess of that obtained in the precipitation of analogous solutions by exposure to analogous copper surface in an ordinary manner, such as treatment in a tank in which the solution is violently agitated, in one manner or another, about a group of copper plates; under such conditions, using temperatures elevated to a range of 80° C.–90° C., the highest operating capacities obtained approximated 7–10 ounces of silver precipitated per cubic foot of tank per 24 hours.

From the foregoing description, it will be ascertained that the precipitation of a component or components from solution may be efficiently and more economically effected by contact with a charge of precipitant, of such state of division as to allow a ready separation from the finely divided precipitate, to which has been imparted sufficient motion for agitation of the mixture and for surface cleansing of the individual units by abrasion of one against another, the operation being accomplished in batches during a single contact period, or by circulation through a number of shorter periods, or by continuous flow through a single precipitator or a number of precipitators in series, and the finely divided precipitate, maintained in suspension by the turbulence of the mixture, being separated from the excess precipitant by displacement with the solution leaving the precipitator and conveyed to a suitable apparatus for effecting separation of liquid from solids; the solution, barren of the constituent or constituents desired removed, being wasted or used as return solvent or conveyed to subsequent operation for the recovery of values and regeneration, or combinations of such distribution.

It is evident that the above procedure and illustrations may be modified to meet the particular needs of the operation to which it is applied, and is not intended to restrict it to the particular examples given. The terms used in describing this invention have been used in their descriptive sense and not as terms of limitation and it is intended to include within the scope of the appended claims all equivalents of the procedures described.

Having fully described our invention, what we claim as new and desire to secure by Letters Patent is:

1. The method of recovering silver from silver bearing solutions which comprises maintaining the solution at a relatively low temperature, continuously subjecting the solution to the precipitating action of large-bodied, plane-surfaced, precipitant elements, and slowly agitating the elements to cause a surface abrasion therebetween thereby removing the finely divided precipitate from the precipitant and to maintain the separated precipitate in suspension for removal and recovery as sponge.

2. The method of recovering silver from silver bearing solutions which comprises maintaining the solution at the relatively low temperature of approximately 55° C., continuously subjecting the solution to the precipitating action of large-bodied, plane-surfaced precipitant elements, and slowly agitating the elements to cause a surface abrasion therebetween thereby removing the finely divided precipitate from the precipitant and to maintain the separated precipitate in suspension for removal and recovery as sponge.

HAROLD EUGENE LEE.
BARTON ROBERT MUIR.